(12) United States Patent
Yumiya et al.

(10) Patent No.: US 9,048,500 B2
(45) Date of Patent: Jun. 2, 2015

(54) FUEL CELL SYSTEM WITH CONTROLLED STANDBY POWER

(75) Inventors: Hiroyuki Yumiya, Nagoya (JP); Katsuki Ishigaki, Handa (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1133 days.

(21) Appl. No.: 12/446,509

(22) PCT Filed: Dec. 14, 2007

(86) PCT No.: PCT/JP2007/074602
§ 371 (c)(1),
(2), (4) Date: Apr. 21, 2009

(87) PCT Pub. No.: WO2008/072793
PCT Pub. Date: Jun. 19, 2008

(65) Prior Publication Data
US 2010/0310953 A1    Dec. 9, 2010

(30) Foreign Application Priority Data
Dec. 15, 2006   (JP) .................. 2006-337748

(51) Int. Cl.
*H01M 8/04* (2006.01)
*H01M 16/00* (2006.01)
*B60L 11/18* (2006.01)

(52) U.S. Cl.
CPC ......... *H01M 16/006* (2013.01); *B60L 11/1885* (2013.01); *B60L 11/1892* (2013.01);
(Continued)

(58) Field of Classification Search
CPC ................................. H01M 8/04223
USPC ......................................................... 429/429
See application file for complete search history.

(56) References Cited

U.S. PATENT DOCUMENTS

| 2002/0092690 A1 | 7/2002 | Benz et al. |
| 2004/0146757 A1 | 7/2004 | Gottwick et al. |
| 2009/0233127 A1* | 9/2009 | Ohya et al. .................. 429/13 |

FOREIGN PATENT DOCUMENTS

| DE | 10028329 A1 | 1/2002 |
| DE | 100 28 331 A1 | 4/2002 |

(Continued)

OTHER PUBLICATIONS

JP 2005-073464 A (Ueda et al.) Mar. 17, 2005 (English language machine translation of document cited on Applicant's IDS dated Apr. 21, 2009). [online] [retrieved Mar. 13, 2012]. Retrieved from: Advanced Industrial Property Network Japan Patent Office.*

(Continued)

*Primary Examiner* — Erin Snelting
(74) *Attorney, Agent, or Firm* — Kenyon & Kenyon LLP

(57) ABSTRACT

A fuel cell system includes an IG switch disposed between a 14V battery and a controller. The fuel cell system also includes a start switch disposed independently of the IG switch. Upon detection of the ON state of the start switch, the controller outputs an FC start instruction to an FC auxiliary device. Moreover, an FC inverter switch is disposed between the 14V battery and the FC auxiliary device. Through the function of the controller, power supply from the 14V battery to the FC auxiliary device is suspended for a period from when a wait time, which is predeterminedly set from the moment when the IG switch is turned ON, has elapsed to the moment when the start switch is turned ON, during a wait period between the moment when the IG switch is turned ON and the moment when the start switch is turned ON.

6 Claims, 4 Drawing Sheets

(52) U.S. Cl.
CPC ....... *B60L11/1894* (2013.01); *H01M 8/04223* (2013.01); *H01M 8/04313* (2013.01); *H01M 8/04925* (2013.01); *H01M 8/04955* (2013.01); *Y02E 60/50* (2013.01); *Y02T 90/34* (2013.01)

(56) References Cited

FOREIGN PATENT DOCUMENTS

| | | |
|---|---|---|
| DE | 10059416 A1 | 6/2002 |
| DE | 10258865 A1 | 7/2004 |
| JP | 2002-50378 A | 2/2002 |
| JP | 2004-22460 A | 1/2004 |
| JP | 2004-103317 A | 4/2004 |
| JP | 2004-178998 A | 6/2004 |
| JP | 2004-192172 A | 7/2004 |
| JP | 2004-192820 A | 7/2004 |
| JP | 2005-050587 A | 2/2005 |
| JP | 2005-73464 A | 3/2005 |
| JP | 2005-229706 A | 8/2005 |
| JP | 2005-332702 A | 12/2005 |
| JP | 2006-114364 A | 4/2006 |
| JP | 2006-333552 A | 12/2006 |
| WO | WO 03/096001 A1 | 11/2003 |
| WO | WO 2006090818 A1 * | 8/2006 |

OTHER PUBLICATIONS

JP 2004-022460 A (Okura) Jan. 22, 2004 (English language machine translation of document cited in applicant's IDS dated Apr. 21, 2009). [online] [retrieved May 16, 2012]. Retrieved from: Advanced Intellectual Property Network Japan Patent Office.*

Office Action mailed Sep. 27, 2011 in JP 2006-337748 and English translation thereof.

Office Action dated Apr. 18, 2013 for co-pending German Patent Application No. EP 112007002656.1 (13 pages).

\* cited by examiner

FUEL CELL SYSTEM WITH CONTROLLED STANDBY POWER

This is a 371 national phase application of PCT/JP2007/074602 filed 14 Dec. 2007, claiming priority to Japanese Patent Application No. JP 2006-337748 filed 15 Dec. 2006, the contents of which are incorporated herein by reference.

TECHNICAL FIELD

The present invention relates to a fuel cell system and a fuel cell start method, and more particularly to a fuel cell system and a fuel cell start method in which electric power is supplied to a load at the time of starting of the system.

BACKGROUND ART

The technology of mounting a fuel cell in vehicles, for example, is being implemented because of its ability to reduce adverse effects on the environment. A desirable voltage or current can be obtained from a fuel cell in the form of a fuel cell stack formed of a combination of a plurality of electric cells. Specifically, a required amount of electric power can be extracted from a fuel cell by supplying fuel gas such as hydrogen to an anode side of the a fuel cell stack and supplying oxidizing gas including oxygen such as air to a cathode side of the fuel cell stack to cause an electrochemical reaction through an electrolytic membrane at an appropriate temperature.

Accordingly, in order to operate a fuel cell system, auxiliary devices for a fuel cell including a pump which supplies fuel gas, an air compressor (ACP) which supplies oxidizing gas, a cooling water circulating pump which controls the temperature of the fuel cell stack and so on, as well as sensors such as a cell monitor which detects the voltage, temperature, and so on of each electric cell forming the fuel cell stack are required. Further, in order to operate the fuel cell system, it is necessary to supply electric power to these auxiliary devices and to consider the timing of supplying of the electric power.

JP 2005-332702 A, for example, discloses a fuel cell diagnostic apparatus which measures resistance of a fuel cell when an ignition switch (IG) is turned ON, and thereafter establishes a ready (READY) state to supply electric power to a motor. Further, WO 03096001 discloses that, when an ignition switch is turned ON, application of power to a heater of a gas sensor is started, and then fuel gas is supplied to generate power.

JP 2004-178998 A discloses a controller of a fuel cell vehicle, in which, when a start switch corresponding to an ignition switch is turned ON, a capacitor switch is closed (ON) and the temperature of a fuel cell and the cell voltage are measured, and, if the measured values are low, electric power is supplied from the fuel cell to an auxiliary device for warming up, and thereafter, a main switch is closed (ON) to supply electric power to a motor.

When a fuel cell system is started, it is necessary to supply electric power to a load such as an auxiliary device for a fuel cell, and so on. Here, the electric power is supplied from a power source other than a fuel cell, i.e. from an electric power storage device such as a low-voltage battery. Therefore, when a capacity of such an electric power storage device such as a secondary battery is small or the electric power storage device is not in a sufficiently charged state, sufficient power supply to the load cannot be achieved at the time of starting the fuel cell system, or the charged state of the electric power storage device at this stage is significantly lowered.

Suppression of standby power is similarly desired in stationary fuel cell systems in which electric power is supplied during a standby state through a power transmission line called grid, for example.

It is therefore necessary to review suppression of power supply to a load at the time of starting a fuel cell system. While JP 2005-332702 and WO 03096001 described above disclose that resistance measurement is performed prior to starting and that power is supplied to a heater for a gas sensor, respectively, neither document describes suppression or reduction or restriction of power supplied from an electric power storage device at the time of starting of the system.

As such, conventionally, review on a working state of an electric power storage device, for example, has not been performed as restriction of power supply to a load at the time of starting a fuel cell system.

One advantage of the present invention is to provide a fuel cell system and a fuel cell system start method which enable suppression of electric power consumed by an electric power storage device at the time of starting the fuel cell system. Another advantage of the present invention is to provide a fuel cell system and a fuel cell system start method which enable suppression of electric power supplied to a load at the time of starting the fuel cell system. The solutions described below contribute to achieving at least one of these advantages.

DISCLOSURE OF THE INVENTION

A fuel cell system according to the present invention includes an operation device which, when a shift to a first control state from a second control state which is a wait state for the first control state is instructed, instructs start of the second control state for shifting to the first control state; and a power consumption reduction unit which, in the second control state, reduces power consumption by a load related to waiting in response to input of a reduction instruction to reduce power consumption of the load.

Further, it is preferable that the reduction instruction is input when a state of the fuel cell system satisfies a predetermined condition.

Also, a fuel cell system according to the present invention includes a first operation device which instructs start of a control system, which is a first control state; a second operation device which instructs shifting to a state which allows traveling by a fuel cell, which is a second control state; and a power consumption suppression unit which suspends supply of electric power from an electric power storage device to an auxiliary device for the fuel cell for a period from a moment after elapse of a wait time which is predeterminedly set from a moment when the first operation device is turned ON to a moment when the second operation device is turned ON, during a wait period from when the first operation device is turned ON to the second operation device is turned ON.

Moreover, it is preferable that the power consumption suppression unit suspends supply of electric power from the electric power storage device to a fluid pump for the fuel cell.

It is also preferable that the power consumption suppression unit further suspends supply of electric power from the electric power storage device to a cell monitor which monitors a state of the fuel cell.

In addition, a fuel cell system according to the present invention includes a first operation device which provides, as an instruction to start a fuel cell, an instruction to supply electric power to an auxiliary device for the fuel cell through a power transmission line; a second operation device which instructs shifting to a power generation state of the fuel cell; and a power consumption suppression unit which suspends supply of the electric power through the power transmission line for a period from a moment after elapse of a wait time which is predeterminedly set from a moment when the first operation device is turned ON to a moment when the second operation device is turned ON, during a wait period from when the first operation device is turned ON to the second operation device is turned ON.

Furthermore, a method of starting a fuel cell system according to the present invention includes starting a controller by turning a first operation device ON; determining whether or not a second operation device which instructs a shift to a state which allows traveling by a fuel cell is turned ON; and when it is determined that the second operation device is not turned ON, determining whether or not a wait time, which is predeterminedly set after the first operation device is turned ON, has elapsed; and suspending supply of electric power from an electric power storage device to an auxiliary device for the fuel cell, for a period from when elapse of the wait time is determined until the second operation device is turned ON thereafter.

A fuel cell system according to the above structures may include an operation device which, when an instruction to shift to a first control state is provided, instructs start of a second control state for shifting to the first state, and, in the second control state, reduces power consumption of a load concerning waiting, in response to input of a reduction instruction to reduce power consumption of the load. As such, the power consumption of the load can be suppressed at the time of starting the fuel cell system.

Further, a fuel cell system according to the above structures may include a first operation device which instructs start of a control system and a second operation device which instructs a shift to a state which allows traveling by a fuel cell, and suspends supply of electric power from an electric power storage device to an auxiliary device for the fuel cell for a period from a moment after elapse of a wait time which is predeterminedly set from a moment when the first operation device is turned ON to a moment when the second operation device is turned ON, during a wait period from when the first operation device is turned ON to the second operation device is turned ON. As such, unnecessary power consumption by the electric power storage device until the second operation device is turned ON can be suppressed at the time of starting the fuel cell system.

Further, the power consumption suppression unit may suspend supply of electric power from the electric power storage device to a fluid pump for the fuel cell. Moreover, it is also preferable that the power consumption suppression unit further suspends supply of electric power from the electric power storage device to a cell monitor which monitors a state of the fuel cell. Because shifting to the state which allows travelling by a fuel cell is not instructed until the second operation device is turned ON, the unnecessary power consumption by the electric power storage device can be suppressed by the above structures.

Furthermore, with at least one of the above structures, a fuel cell system includes a first operation device which provides, as an instruction to start a fuel cell, an instruction to supply electric power to an auxiliary device for the fuel cell through a power transmission line and a second operation device which instructs shifting to a power generation state of the fuel cell, and suspends supply of the electric power through the power transmission line for a period from a moment after elapse of a wait time which is predetermined set from a moment when the first operation device is turned ON to a moment when the second operation device is turned ON, during a wait period from when the first operation device is turned ON to the second operation device is turned ON. As such, at the time of starting the fuel cell system, unnecessary power consumption by the auxiliary device until the second operation device is turned ON can be suppressed.

BRIEF DESCRIPTION OF THE DRAWINGS

These and other advantages of the invention will be explained in the description below, in connection with the accompanying drawings, in which.

BEST MODE FOR CARRYING OUT THE INVENTION

A preferred embodiment of the present invention will be described with reference to the drawings. While in the following description, a fuel cell system has a structure in which a bidirectional voltage converter is provided between a fuel cell stack and a secondary battery pack, the fuel cell system may have another structure in which an element having a power distribution function is provided between the fuel cell stack and the secondary battery pack and electric power is supplied from the power distributor to a load. Further, while in the following description, the fuel cell system includes, in addition to the above-described elements, a 14V DC/DC converter, a 14V battery, a system main relay, and so on as constituent elements, some of these elements may not be included, or the system may include additional elements.

Further, while, in the following description, a 14V battery is used as a power source for supplying power to a load such as an auxiliary device for a fuel cell, for example, any power sources other than a fuel cell may also be used. For example, a low-voltage battery other than a 14V battery, or in some cases a high-voltage secondary battery, may be used. Alternatively, an electric power storage unit such as a capacitor, rather than a battery, may also be used. A secondary battery or an electric power storage device as used herein refers generally to a chargeable and dischargeable power storage unit, such as a battery and capacitor, and a power source for supplying power to the auxiliary device for a fuel cell and so on may be an electric power storage device in this broad sense.

Further, while a fuel cell for mounting on a vehicle will be described, a stationary fuel cell may also be applicable. In this case, as a means which supplies electric power to the load, other than a fuel cell, a unit which externally supplies electric power via a power transmission line called grid may be used.

Figure 1:
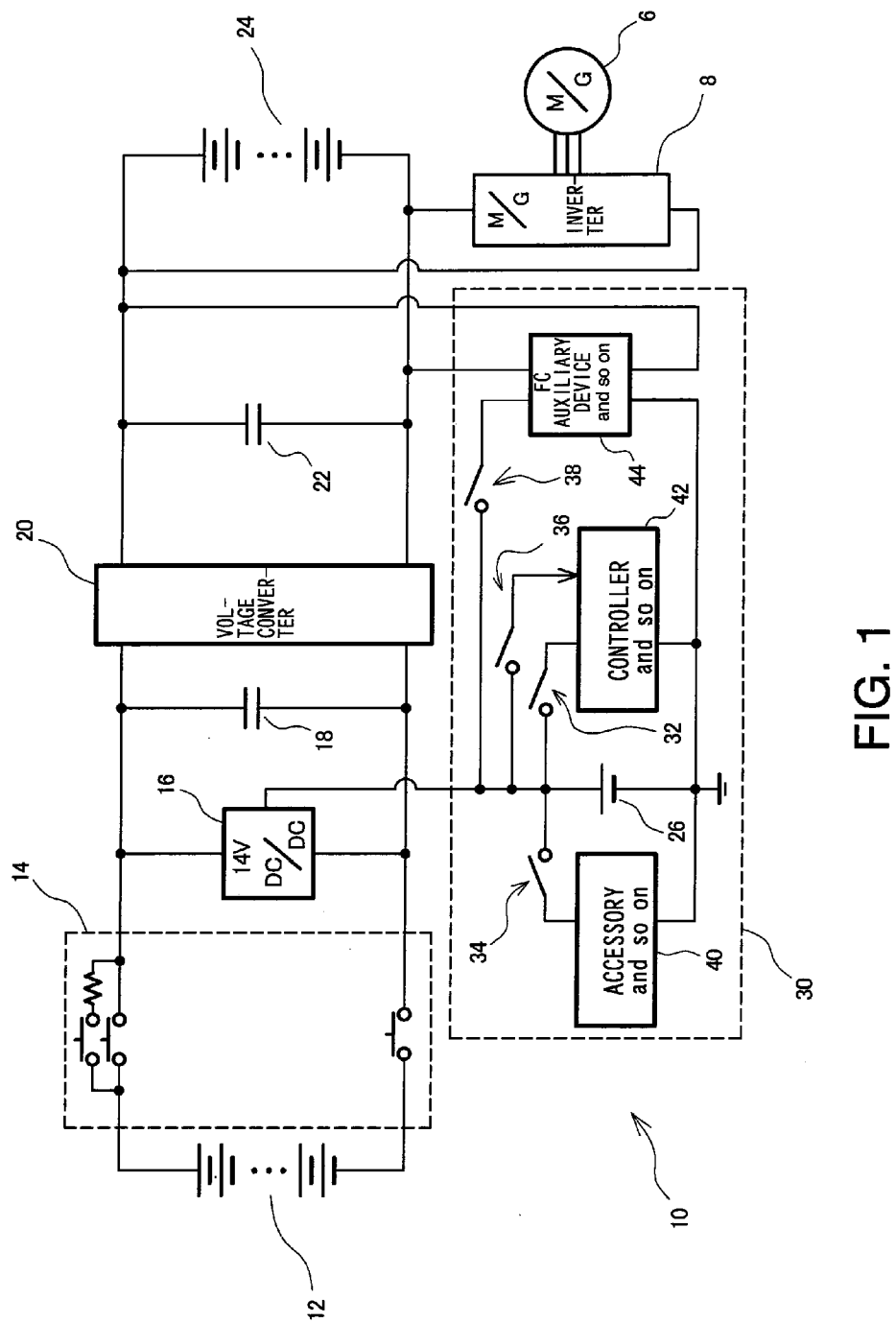
FIG. 1 is a diagram showing a structure of a fuel cell system in accordance with an embodiment of the present invention.

FIG. 1 is a diagram showing a structure of a fuel cell system 10. The fuel cell system 10 includes a high-voltage secondary battery 12, a system main relay, a 14V DC/DC converter 16, a high-voltage secondary battery side smoothing capacitor 18, a voltage converter 20, a fuel cell side smoothing capacitor 22, and a fuel cell stack 24. An output of the 14V DC/DC converter 16 is connected with a 14V battery 26. The contents of a block 30 relating to the 14V battery 26 will be described in detail below with reference to FIG. 2. Here, a motor generator inverter, M/G inverter 8, is connected between a positive electrode bus and a negative electrode bus on the fuel cell side and a vehicle motor generator (M/G) 6 is connected to the M/G inverter 8, although they do not constitute the fuel cell system 10.

The high-voltage secondary cell 12 is a battery pack which is a high-voltage battery of approximately 200 to 400 V, e.g. about 288 V, formed of a combination of a plurality of lithium ion electric cells or a combination of a plurality of nickel hydrogen electric cells.

The system main relay 14 is a relay on the high-voltage secondary battery 12 side which turns the high-voltage power line ON and OFF. In consideration of relay adhesion at the time of shutting down the high-voltage power, one relay is provided on the positive electrode bus side and one on the negative electrode bus side. Further, one additional relay having a current limiting resistor connected therewith is provided on the bus on either one of the negative electrode side and the positive electrode side. This relay connected with the current limiting resistor has a function of gradual charging when being turned ON, for example.

The 14V DC/DC converter 16 is a voltage converter which has a function of adjusting the high-voltage power to a low voltage of 14V and supplying the low-voltage power to the 14V battery 26 which is a low-voltage power source. When performing bidirectional operation, the electric power from the 14V battery 26 can be adjusted back to the high-voltage side, in the case of an emergency or the like.

The high-voltage secondary battery side smoothing capacitor 18 is a large-capacity capacitor having a function of absorbing a variation in voltages or the like between the positive bus and the negative bus on the side of the high-voltage secondary battery 12 and creating direct-current electric power to thereby suppress pulsating voltage or the like.

The voltage converter 20 is a bidirectional voltage converter for high voltages, which has a function of performing voltage conversion between the high-voltage electric power on the high voltage secondary battery side and the high-voltage electric power on the fuel cell stack 24 side, to thereby exchange same high-voltage electric power between the high voltage secondary battery and the fuel cell pack.

The fuel cell side smoothing capacitor 22 is a large-capacity capacitor having a function of absorbing a variation in voltages or the like between the positive bus and the negative bus on the side of the fuel cell and creating a direct-current electric power to thereby suppress pulsating voltage or the like.

The fuel cell stack 24 is a type of battery pack which is configured by a combination of a plurality of electric fuel cells, such that a high voltage on the order of between approximately 200V and 400V, such as generation power of approximately 288V, for example, can be extracted. Here, each fuel cell is able to provide desired electric power through a electrochemical reaction through an electrolysis membrane, which is a solid polymer membrane, with hydrogen being supplied as fuel gas to the anode side and air being supplied as oxidizing gas to the cathode side. In order to operate the fuel cell stack 24, the operation of a load such as a fuel cell auxiliary device or the like, as will be described below, is required.

Further, hydrogen is supplied to the fuel cell stack 24 from a hydrogen storage device which is not shown. A hydrogen tank, a hydrogen storage alloy, and so on may be used as the hydrogen storage device.

With the above structure, direct current power supplied from the power source composed of the high-voltage secondary battery 12 and the fuel cell stack 24 can be converted into three-phase power by the M/G inverter 8 to drive the vehicle motor generator 6. Also, when braking is applied to slow the vehicle, regenerative power of the vehicle motor generator 6 can be converted into direct current power by the M/G inverter 8, so that the high-voltage secondary battery 12 can be charged with this direct current power.

Figure 2:
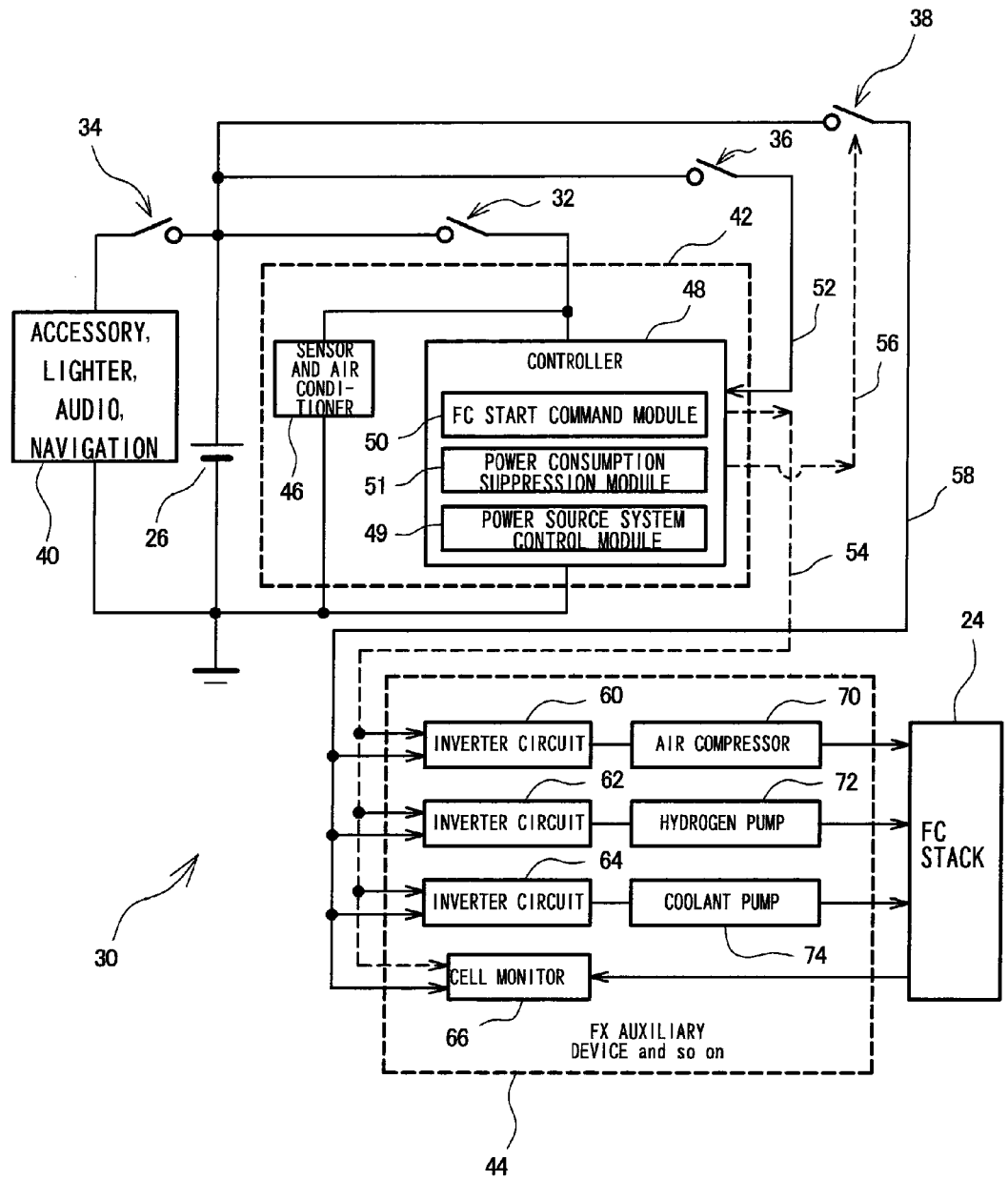
FIG. 2 is a diagram showing details of a block relevant to the 14V battery in the fuel cell system according to the embodiment of the present invention.

FIG. 2 shows details of the block 30 related to the 14V battery 26 in the fuel cell system 10. Here, the 14V battery 26 is a low-voltage secondary battery formed of a lead-acid battery, that is an electric power storage device. In the following description, reference numerals used in FIG. 1 will be used to describe corresponding components.

As shown in FIG. 2, electric power from the 14V battery 26 is supplied to three roughly-classified groups, i.e. a group of an accessories and so on 40, a group of a controller and so on 42, and a group of an FC auxiliary device and so on 44. Here, "FC" is an abbreviation of "Fuel Cell". Among these, the FC auxiliary device and so on 44, which are connected between the positive electrode bus and the negative electrode bus in the arrangement between the fuel cell side smoothing capacitor 22 and the fuel cell stack 24, receive both the power supply from the 14V battery 26 and the high-voltage power supply from the fuel cell stack 24 side. Further, an IG switch 32, an accessory switch 34, a start switch 36, and an FC inverter switch 38 are provided between the 14V battery 26 and the corresponding one of three roughly classified groups, respectively. The group of accessories and so on 40 corresponds to a group of a plurality of elements including a lighter, an audio device, a navigation device, and so on, which are mounted in a vehicle. The accessory switch 34 is provided between the 14V battery 26 and the group of accessories and so on 40. An operation unit for the accessory switch 34 is provided within a vehicle compartment. When the operation unit is actuated by a driver or the like to turn the accessory switch ON, electric power is supplied to the accessories and so on 40 so that the lighter or the like can be used.

The group of controller and so on 42 can be subdivided into a group of sensor and air conditioner and so on 46 and a controller 48. The sensors are used to detect the state of each component in the fuel cell system 10 and include a voltage detection sensor for each electric cell forming the fuel cell stack 24, a temperature detection sensor, a flowmeter for fuel gas to be supplied to the fuel cell stack 24, a flowmeter for oxidizing gas, a coolant temperature gauge for coolant, and so on. The air conditioner and so on include a fan used for air conditioning within the vehicle compartment, a heater, and a refrigerant circulation pump, and so on.

The controller 48 has a function of comprehensively controlling the operation of each component of the fuel cell system 10, particularly a function of performing start control of the fuel cell system 10. Such a controller 48 can be formed by an on-vehicle computer which can be composed of a microprocessor chip or the like. While the controller 48 can be formed of an independent computer, the function of the controller 48 can be provided by other on-vehicle computers. In a vehicle having a hybrid CUP, for example, the function of the controller 48 may be provided by the hybrid CPU.

The controller 48 includes, as control functions, a power source system control module 49, an FC start command module 50 which provides a start command to the FC auxiliary device and so on 44, and a power consumption suppression module 51 which controls the operation of the FC inverter switch 38, which will be described below, to suppress power consumption at the time of starting. These functions can be implemented by software, by, for example, executing a corresponding fuel cell system control program.

The IG switch 32 is provided between the 14V battery 26 and the controller and so on 42. Here, while the term "IG", which is an abbreviation of "ignition" and originally refers to ignition of an internal combustion engine, is not necessarily suitable for the fuel cell system 10, the term "ignition switch" has long been used by those in the art as a term referring to a start switch of a vehicle. Accordingly, the term "ignition switch" is used in this application to refer to an operation device serving as a start switch of a vehicle.

The operation unit for the IG switch 32 is provided within a vehicle compartment. When the operation unit is actuated by a driver or the like to turn the IG switch 32 ON, electric power is supplied to the controller and so on 42 to activate the controller 48 and start the fuel cell system control program. In other words, the IG switch 32 is a switch which instructs start of the control system of a vehicle and which is first operated by the driver or the like at the time of starting the vehicle. Therefore, for the purpose of differentiation from other switches, the IG switch 32 can be referred to as a "first switch" or a "first operation device".

While, in the above example, the accessory switch 34 is provided in addition to the IG switch 32, the system can be configured such that the accessory switch 34 operates simultaneously with the IG switch 32 and therefore substantially a single switch can be used to actuate the controller and so on 42 and the accessories and so on 40.

Between the 14V battery 26 and the controller 48, the start switch 36 is further provided independently of the IG switch 32. As shown in FIG. 2, an ON/OFF signal 52 of the start switch 36 is transmitted to the controller 48. The controller 48, detecting that the start switch 36 is turned ON, outputs an FC start command signal 54 to the FC auxiliary device and so on 44 by means of the function of the FC start command module 50.

The operation unit for the start switch 36 is provided within a vehicle compartment. When the operation unit is operated by the driver or the like to turn the start switch 36 ON, the FC start command signal 54 is output to the FC auxiliary device and so on 44 as described above. Upon receiving the FC start command signal 54, the FC auxiliary device and so on 44 start on the assumption that other necessary conditions are satisfied. Accordingly, the start switch 36 has a function of an operation device serving as a switch which instructs a shift to a state which allows vehicle traveling by a fuel cell.

Here, the start switch 36, which is operated by the driver or the like after the IG switch 32 is turned ON as described above, can be referred to as a second switch or a second operation device for the purpose of differentiation from other switches.

The FC auxiliary device and so on 44 are electric devices used for actuating the fuel cell stack 24, and include rotary devices such as an air compressor (ACP) 70 which compresses oxidizing gas and supplies the compressed oxiding gas to the fuel cell stack 24, a hydrogen pump 72 which supplies hydrogen which is fuel gas into the fuel cell stack 24, and a coolant pump 74 for cooling the fuel cell stack 24 with the coolant, as well as inverter circuits 60, 62, and 64 for driving these rotary devices, respectively. In addition, a cell monitor 66 which monitors the voltage, temperature, and so on of each battery 20 cell forming the fuel cell stack 24 is included, as an electric device used for actuating the fuel cell stack 24.

The FC inverter switch 38 is provided between the 14V battery 26 and the FX auxiliary device and so on 44. As shown in FIG. 2, the FC inverter switch 38 has a function of switching between supplying and suspending supplying electric power of the 14V battery 26 to the inverter circuits 60, 62, and 64 and the cell monitor 66 through signal 58. The FC inverter switch 38, in contrast to the IG switch 32, the accessory switch 34, and the start switch 36 described above with reference to FIG. 2, is controlled by the function of the power consumption suppression module 51, rather than operation by the driver or the like.

Here, specific functions of the power consumption suppression module 51 will be described. The power consumption suppression module 51, based on the ON/OFF signal of the IG switch 32 and the ON/OFF switch of the start switch 36, outputs an ON/OFF signal of the FC inverter switch 38. More specifically, the power consumption suppression module 51 has a function of suspending power supply from the 14V battery to the FC auxiliary device and so on 44 for a period between the moment after elapse of an predeterminedly set wait time from when the first switch is turned ON and the moment when the second switch is turned ON, during a wait period between the moment when the first switch is turned ON and the moment when the second switch is turned ON.

As described above, the IG switch 32 which is the first operation device is a switch which instructs start of a vehicle, and the start switch 36 which is the second operation device is a switch which instructs a shift to a state which allows vehicle traveling by a fuel cell. In a state which allows vehicle traveling is a first control state and a wait state which is to shift to the first control state upon input of an instruction to shift to the first control state is a second control state, the IG switch 32 which is the first operation device is an operation device which instructs start of the second control state, and the start switch 36 which is the second operation device is an operation device which instructs a shift to the first control state.

Then, the ON/OFF control signal 56 output from the power consumption suppression module 51 is a means for communicating a reduction instruction for reducing power consumed by a load, such as the FC auxiliary device and so on 44, under predetermined conditions during the wait period which is the second control state. More specifically, here, during the wait period from the moment when the IG switch 32 which is the first operation device is turned ON to enter the wait state until the moment when the start switch 36 which is the second operation device is turned ON to issue a command to shift to the state which allows vehicle traveling, if a predetermined condition that an predeterminedly set wait time has elapsed after the moment when the first switch is turned ON is satisfied, the ON/OFF signal 56 is turned OFF. Such turning OFF of the ON/OFF signal 56 serves as a reduction instruction to reduce the power consumed by the load.

The FC auxiliary device and so on 44 are electric devices used for actuating the fuel cell stack 24, as described above. Accordingly, the FC auxiliary device and so on 44 need not be started until the start switch 36 is turned ON by the operation of the driver or the like to instruct a shift to the state in which a vehicle can travel by a fuel cell. The system which is configured such that the FC auxiliary device and so on 44 are started simultaneously with turning ON of the IG switch 32 is convenient as long as the start switch 36 is turned ON immediately after the turning ON of the IG switch 32, because shifting to the state which allows vehicle traveling by a fuel cell can be achieved immediately. However, if the start switch 36 has not been turned ON for some time since the IG switch 32 is turned ON, the operation of the FC auxiliary device and so on 44 during this period is useless. Thus, according to the present invention, while the system is configured to wait for turning ON of the start switch 36 to start the FC auxiliary device and so on 44 simultaneously with turning ON of the IG switch 32, if a long time has elapsed after the turning ON of the IG switch 32, power supply to the FC auxiliary device and so on 44 is temporarily suspended and, upon turning ON of the start switch 36, power supply to the FC auxiliary device and so on 44 is resumed. With this structure, at the time of starting the fuel cell system 10, electric power of the 14V battery 26 which is wasted by the FC auxiliary device and so on 44 until the start switch 36 which is the second switch is turned ON can be suppressed.

Figure 3:
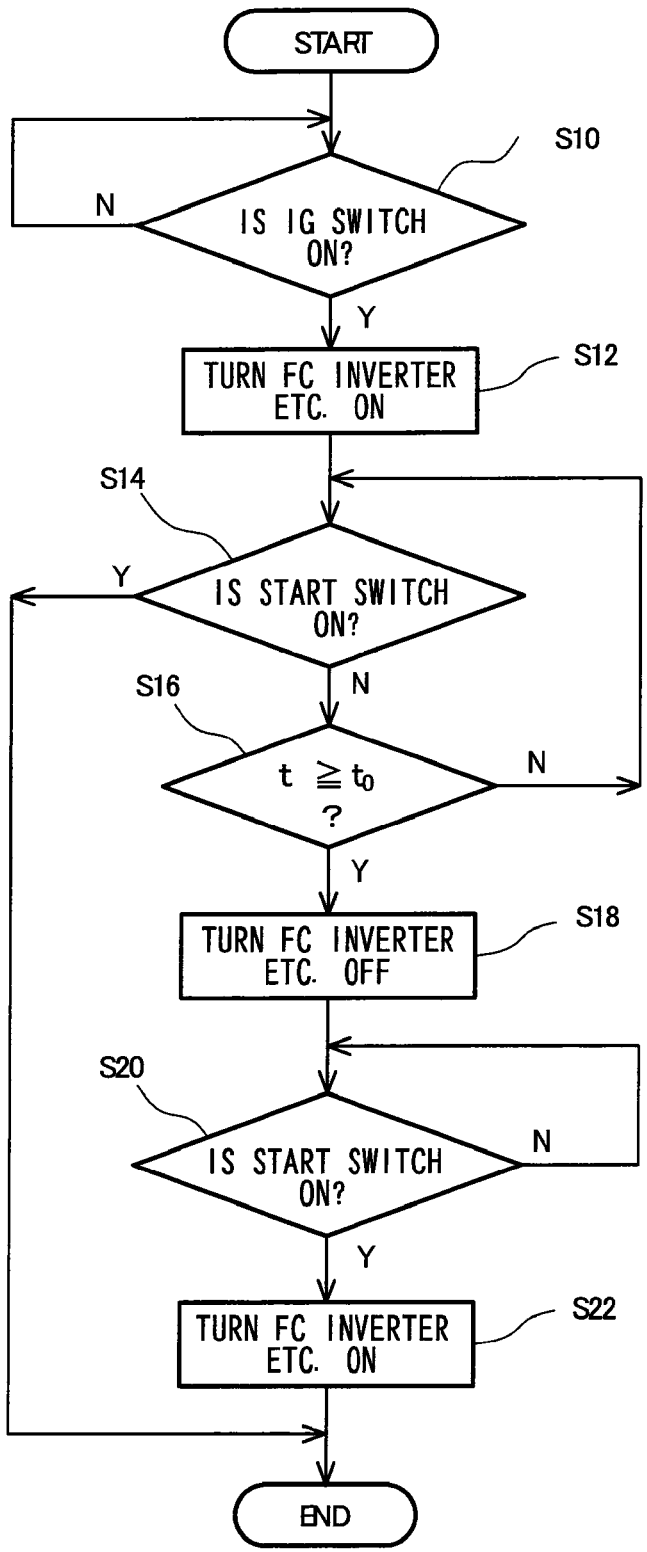
FIG. 3 is a flowchart showing procedural steps for suppressing power consumption at the time of starting the fuel cell system according to the embodiment of the present invention.
Figure 4:
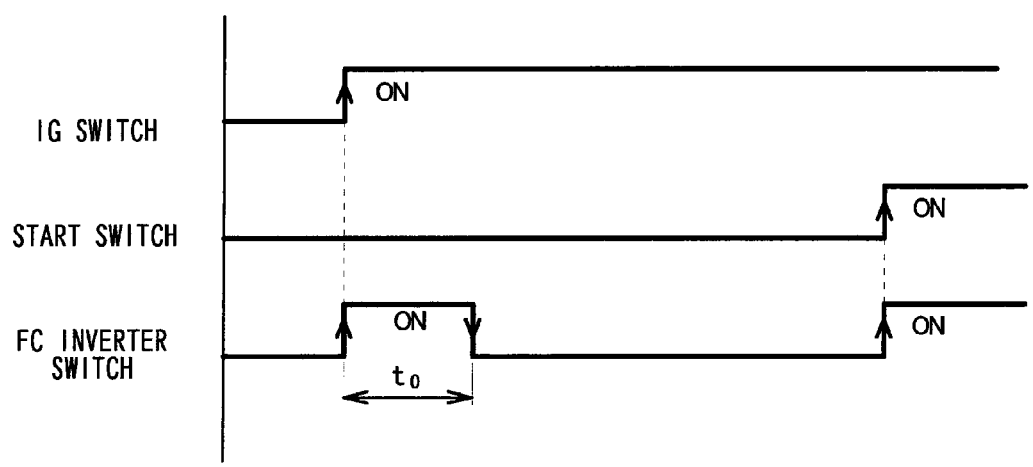
FIG. 4 is a time chart showing ON/OFF timing of each switch of the fuel cell system according to the embodiment of the present invention.

The operation of the fuel cell system 10 with the above-described structure, and particularly each function of the controller 48 will be described with reference to FIGS. 3 and 4. In the following description, the numerals used with reference to FIGS. 1 and 2 will be used. FIG. 3 is a flowchart showing the procedural steps for power consumption suppression at the time of starting the fuel cell system 10. Each of the procedural steps corresponds to the procedural step of each processing of a power consumption suppression program included in a corresponding fuel cell system control program. FIG. 4 is a timing chart showing the ON/OFF timing of each switch of the fuel cell system 10. In FIG. 4, the horizontal axis indicates a time with respect to a common origin and the vertical axis indicates ON or OFF of each switch.

In the first procedural step for suppressing the power consumption at the time of starting the fuel cell system 10, whether or not the IG switch 32 is turned ON is determined (S10). This step is repeated until it is determined that the IG switch 32 is turned ON. When it is determined that the IG switch 32 is turned ON, the FC inverter switch 38 is turned ON (step S12). These functions are actually executed by supplying electric power from the 14V battery 26 to the controller 48 to start the controller 48, and, simultaneously with or after elapse of an appropriate processing time from the start of the controller 48, outputting the ON/OFF control signal 56, which is an ON signal in this case, to the FC inverter switch 38. Accordingly, the FC auxiliary device and so no 44 are actuated.

It is next determined whether or not the start switch 36 is turned ON (S14). As the start switch 36 is normally not turned ON simultaneously with turning ON of the IG switch 32, an elapsed time t from the turning ON of the IG switch 32 is compared with a predetermined wait time $t_0$ (S16). The wait time $t_0$ can be set predetermined, and may be set to 5 sec, for example. If the elapsed time t does not reach the wait time $t_0$, the processing returns to step S14.

When it is determined that the start switch 36 is turned ON before the elapsed time t reaches the wait time $t_0$ (S14), the procedural steps in FIG. 3 terminates in this state. Specifically, the FC inverter switch 38 remains ON.

On the other hand, when it is determined that the elapsed time t reaches the wait time $t_0$ before it is determined that the start switch 36 is turned ON, the FC inverter switch 38 is turned OFF (S18). This state is shown in FIG. 4. This function is executed by the function of the power consumption suppression module 51 of the controller 48, which switches the ON/OFF control signal 56 to an OFF signal and outputs this OFF signal to the FC inverter switch 38. With this operation, power supply from the 14V battery 26 to the FC auxiliary device and so on 44 is suspended.

Thereafter, it is again determined whether or not the start switch 36 is turned ON (S20). This step S20 is repeated until it is determined that the start switch 36 is turned ON 36. If it is determined that the start switch 36 is turned ON, the FC inverter switch 38 is again turned ON (S22). With this operation, the FC auxiliary device and so on 44 are actuated. In this case, electric power is supplied from the 14V battery 26 to the FC auxiliary device and so on 44 simultaneously with or after elapse of an appropriate processing time from the turning ON of the start switch 36.

As described above, at the time of starting the fuel cell system, power of the secondary battery consumed by the FC auxiliary device and so on before the second switch is turned ON can be suppressed.

In other words, the system includes an operation device which, when shift to a first control state from a second control state which is a wait state for the first control state, is instructed, instructs start of the second control state for shifting to the first control state, so that, in the second control state, power consumption of a load during waiting can be reduced by input of a reduction instruction to reduce the power consumption of the load.

In the above example, with regards to the shift from the second control state to the first control state, shift from a wait state in which power sources such as a fuel cell and electric power storage devices and so on are electrically disconnected with the motor for vehicle traveling to a state in which these components are electrically connected to enable traveling has been described. In such a case, for electrical connection and disconnection, a switching element such as a relay, for example, may be used, as described above.

Alternatively, from a different point of view, the shift from the second control state to the first control state may be a shift from a wait state in which a motor for traveling is not driven to prevent generation of acceleration even when an operation is performed by an acceleration operation device such as an accelerator pedal for instructing acceleration of the traveling speed of a fuel cell vehicle to a traveling mode or the like in which the motor for traveling is driven in response to the operation performed by the acceleration operation device. In such a case, a command for the shift from the second control state to the first control state can be input through a so-called shift lever which designates the traveling mode.

Further, shifting from the second control state which is not yet a power generation state, in which fuel gas and oxidizing gas is not supplied to a fuel cell, to the first control state which is a power generation state in which fuel gas and oxiding gas is supplied to a fuel cell may also be considered. With such a structure, power saving can be achieved similarly in a stationary fuel cell under predetermined conditions.

As described above, the first control state and the second control state as used herein are used in a broad sense which include a control state of the system, a control state of the traveling mechanism, a power generation state, and so on. Further, the shift from the second control state to the first control state can also refer to a continuous change of a state such as transition of a state and continuous shift of a state, in addition to shift from one state to another state.

Also, in the above example, as a condition for instructing power reduction in the load, a predetermined condition that an predetermined set wait time has elapsed from the moment when the first operating device is turned ON during a wait period, which starts from turning ON of the first operation device until reception of an instruction for the second operating device to shift to the state which allows traveling is used. As such, it is preferable that the instruction for power reduction in a load is input when a status of the fuel cell system satisfies a predetermined condition. The predetermined condition is not limited to the condition that an accumulated time from the shift to the second control state has reached a predetermined time as described above, and it is also possible to issue an instruction for power reduction under a condition that an electric power storage amount of the electric power storage device which supplies electric power to a load is detected during the second control state and the electric power storage amount is less than a predetermined level. Alternatively, from a different point of view, it is also possible to detect a state of a user and input a power reduction instruction in accordance with the detection result. For example, whether or not a person is present in the driver's seat is detected and, if no one is detected, it may be determined that no shift to the first control state will not be performed by the driver or the like for some time, and an instruction for power reduction may be issued.

As described above, the wait state for the first control state refers to a control mode which can shift to the first control state in accordance with an instruction. It is preferable that a state which allows a shift to the first control state should occur only during the second control state. Specifically, the system may be configured such that the shift to the first control state can be achieved only via the second control state.

INDUSTRIAL APPLICABILITY

The fuel cell system and the fuel cell system start method according to the present invention can be utilized in a fuel cell system mounted on a vehicle or the like, in a stationary fuel cell system, and so on.

The invention claimed is:

1. A fuel cell system, comprising:
a first operation device which provides, as an instruction to start a fuel cell, an instruction to supply an electric power, through a power transmission line, to an auxiliary device which is an electric device used for actuating the fuel cell and including an inverter circuit for the auxiliary device;
a second operation device which instructs a shift to a power generation state of the fuel cell, wherein a wait period is defined as the period from the moment the first operation device is turned ON to the moment when the second operation device is turned ON;
a power consumption suppression unit which suspends supply of the electric power through the power transmission line, wherein the suspension takes place during the wait period, and wherein the suspension starts when a predetermined wait time has elapsed since the first operation device is turned ON, and wherein the suspension ends when the second operation device is turned ON; and
an fuel cell inverter switch controlled by the power consumption suppression unit to disconnect the auxiliary device including the inverter circuit for the auxiliary device from the power transmission line.

2. The fuel cell system according to claim 1, wherein the power transmission line is a power source line which supplies the electric power from an electric power storage device.

3. The fuel cell system according to claim 2, wherein the power consumption suppression unit suspends supply of the electric power in response to input of a reduction instruction to reduce power consumption with regard to the auxiliary device which is a load.

4. The fuel cell system according to claim 3, wherein the reduction instruction is input when a state of the fuel cell satisfies a predetermined condition.

5. The fuel cell system according to claim 3, wherein the power consumption suppression unit further suspends supply of the electric power from the electric power storage device to a fluid pump for the fuel cell.

6. The fuel cell system according to claim 5, wherein the power consumption suppression unit further suspends supply of the electric power from the electric power storage device to a cell monitor which monitors a state of the fuel cell.

* * * * *